(12) United States Patent
Lee et al.

(10) Patent No.: US 8,505,107 B2
(45) Date of Patent: Aug. 6, 2013

(54) CLOUD SERVER AND ACCESS MANAGEMENT METHOD

(75) Inventors: Hou-Hsien Lee, New Taipei (TW);
Chang-Jung Lee, New Taipei (TW);
Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 50 days.

(21) Appl. No.: 13/278,188

(22) Filed: Oct. 21, 2011

(65) Prior Publication Data

US 2012/0167180 A1 Jun. 28, 2012

(30) Foreign Application Priority Data

Dec. 22, 2010 (TW) .............................. 99145253 A

(51) Int. Cl.
*H04L 29/06* (2006.01)
(52) U.S. Cl.
USPC ............................................ 726/29; 726/4
(58) Field of Classification Search
USPC ........................................................ 726/4, 29
See application file for complete search history.

(56) References Cited

U.S. PATENT DOCUMENTS

2003/0225893 A1* 12/2003 Roese et al. .................. 709/227
2011/0167440 A1* 7/2011 Greenfield ...................... 725/25

OTHER PUBLICATIONS

Kindberg, T., Zhang, K., & Shankar, N. (2002). Context authentication using constrained channels. In Mobile Computing Systems and Applications, 2002. Proceedings Fourth IEEE Workshop on (pp. 14-21). IEEE.*

* cited by examiner

*Primary Examiner* — Zambiz Zand
*Assistant Examiner* — Michael Guirguis
(74) *Attorney, Agent, or Firm* — Altis Law Group, Inc.

(57) ABSTRACT

A cloud server stores information, such as a location data range, IP addresses, account names, and passwords of authorized clients. When receiving an access request from a client, the cloud server determines if location data of the client falls within the location data range and an IP address, an account name, and a password of the client matches corresponding information of any authorized client. If the location data of the client falls within the location data range and an IP address, an account name, and a password of the client match information of any authorized client, the cloud server determines that the client is an authorized client and permits the client to access the cloud server.

15 Claims, 4 Drawing Sheets

CLOUD SERVER AND ACCESS MANAGEMENT METHOD

BACKGROUND

1. Technical Field

The embodiments of the present disclosure relate to cloud computing technology, and particularly to a cloud server and an access management method for protecting data security of the cloud server.

2. Description of Related Art

A private cloud is an infrastructure operated solely for a single organization or an enterprise. Data stored by the private cloud often includes private information, such as client information, salary structure, finance reports, client information of the enterprise. Therefore, it is very important to protect data security of the private cloud. At present, access control of the private cloud is often by identifying IP addresses, or accounts and passwords of internal clients of the private cloud. One problem is that, the IP addresses and the accounts and passwords may be hacked and misused by hackers.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
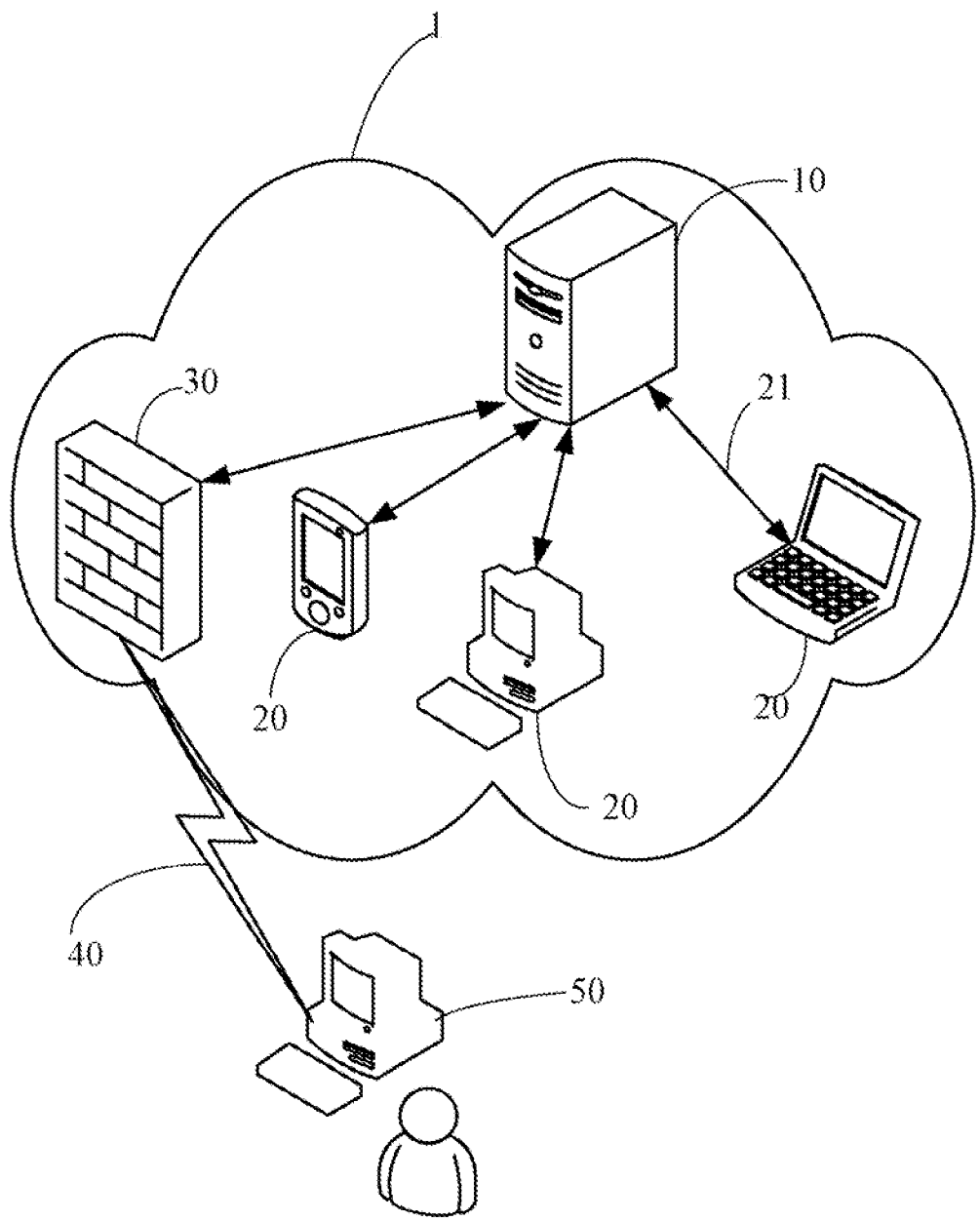
FIG. 1 is a block diagram of one embodiment of an application environment of a data center including at least one cloud server.

FIG. 1 is a block diagram of one embodiment of an application environment of a data center 1 including at least one cloud server 10. In one embodiment, the data center 1, which is located behind a firewall 30 and is designed for cloud computing capability and capacity, includes at least one cloud server 10. The at least one cloud server 10 is connected to one or more authorized clients 20 via an internal network 21. The authorized clients 20 are defined as internal clients who have the right to access the data center 10. The firewall 30, which is connected to the at least one cloud server 10, may further be connected to an external network 40, and protects the cloud server 10 from unauthorized access from any external clients 50, to secure data in the cloud server 10. In one embodiment, the data includes secret information, such as client information, salary structure, finance reports, client information of an enterprise or an organization. The internal network 21 may be a local area network, and the external network 40 may be a wide area network, such as the Internet.

In one embodiment, the cloud server 10 assigns IP addresses to the authorized clients 20. The cloud server 10 may be a dynamic host configuration protocol (DHCP) server and may provide three modes for allocating IP addresses to the authorized clients 20. The three modes are dynamic allocation, automatic allocation, and static allocation. In one embodiment, the cloud server 10 uses dynamic allocation to assign an IP address to each authorized client 20. The cloud server 10 further sets an account name (e.g., apple) and a password (e.g., 123456$) for each authorized client 20 for enabling the authorized client 20 to access the cloud server 10. The cloud server 10 also provides an access privilege for each authorized client 20 according to the assigned IP address and the account name. Depending on the embodiment, the cloud server 10 may be a personal computer (PC), a network server, or any other item of data-processing equipment. Further details of the cloud server 10 will be described.

Figure 2:
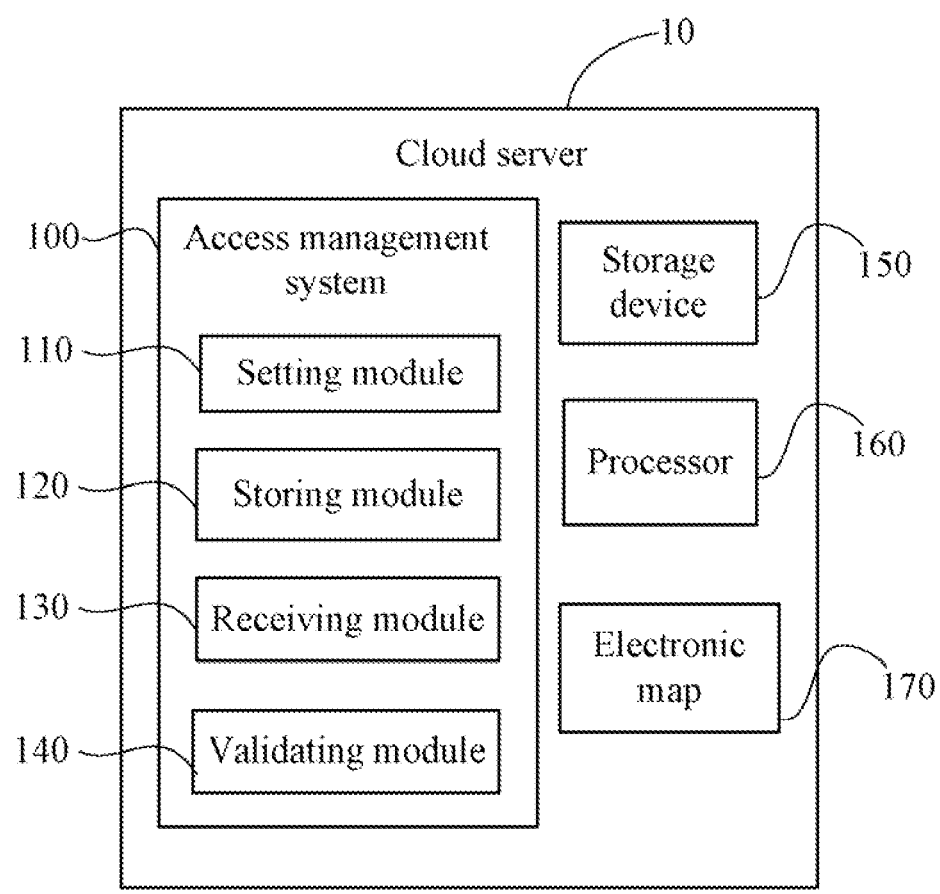
FIG. 2 is a block diagram of one embodiment of function modules of the cloud server included in FIG. 1.

In one embodiment, each authorized client 20 includes a global positioning system (GPS) receiver module for obtaining location data, including geographical coordinates, such as latitude, longitude, and altitude, of the authorized client 20. The information relating to all the authorized clients 20, such as the geographical location(s) of all authorized clients 20 (location data range), IP addresses, account names, and passwords of all authorized clients 20 are stored in a storage device 150 (as shown in FIG. 2) of the at least one cloud server 10. When the cloud server 10 receives an access request from a client, the cloud server 10 determines if the client is an authorized client 20 according to location data sent automatically by the client and further authentication information, such as an IP address, an account name, and a password of the client. If the location data falls within the location data range, and the further authentication information of the client matches the pre-stored information of one of the authorized clients 20, the cloud server 10 determines that the client is an authorized client 20 and permits the client to access the cloud server 10. Otherwise, if there is no location data, or if the location data falls outside the location data range, or if the further authentication information of the client does not match the pre-stored information of any one of the authorized clients 20, the cloud server 10 determines that the client is an external client 50 and refuses the client to access to the cloud server 10.

Figure 3:
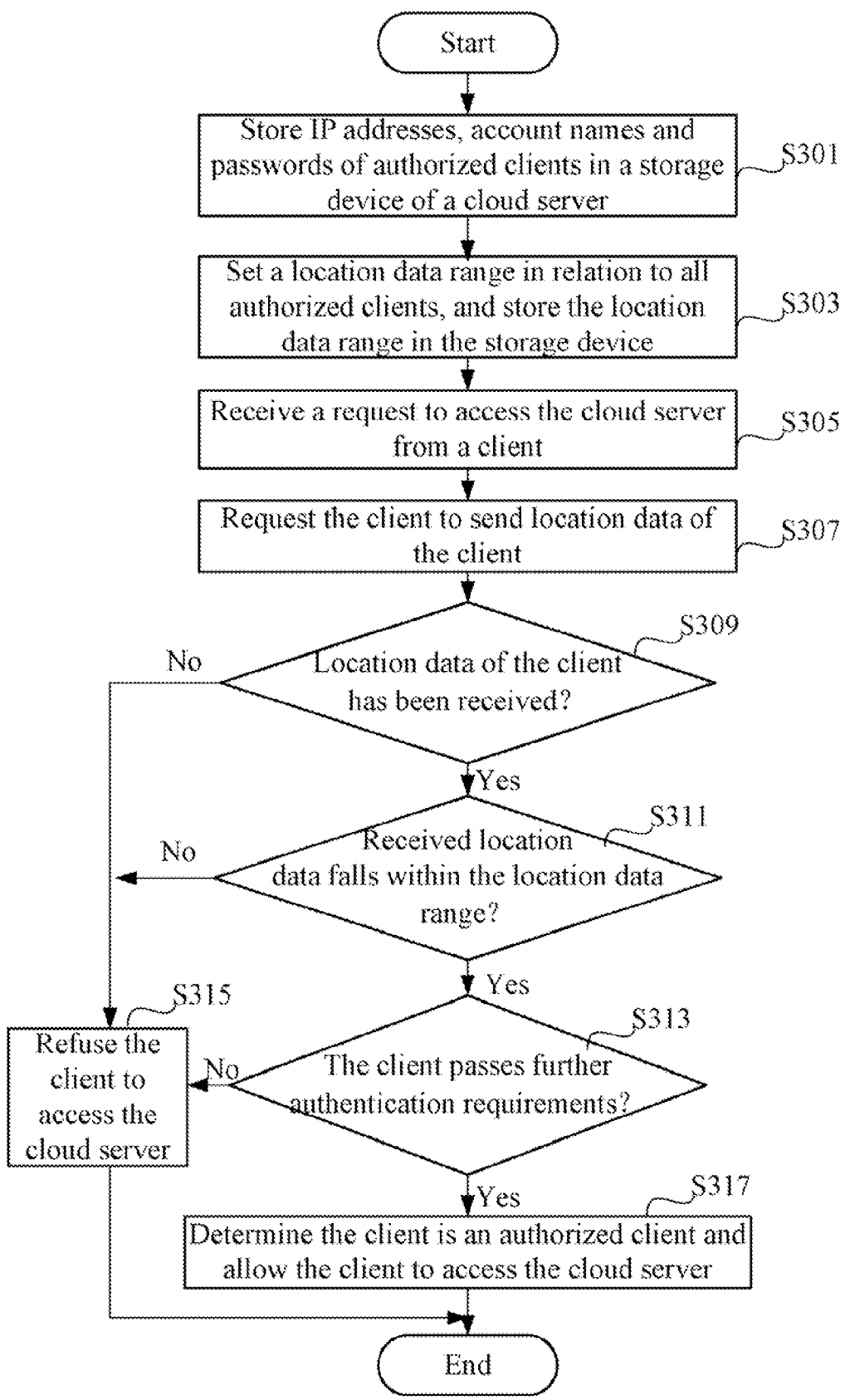
FIG. 3 is a flowchart of one embodiment of an access management method for protecting data security of the cloud server.

FIG. 2 is a block diagram of one embodiment of function modules of the cloud server 10 including an access management system 100. In one embodiment, the cloud server 10 further includes a processor 160 and an electronic map 170. The access management system 100 includes a setting module 110, a storing module 120, a receiving module 130, and a validating module 140. The modules 110-140 may include computerized code in the form of one or more programs that are stored in the storage device 150. The computerized code includes instructions that are executed by the processor 160 to provide the below-described functions of the modules 110-140 (as illustrated in FIG. 3). The storage device 150 may be a cache or a dedicated memory, such as an EPROM, HDD, or flash memory.

Figure 4:
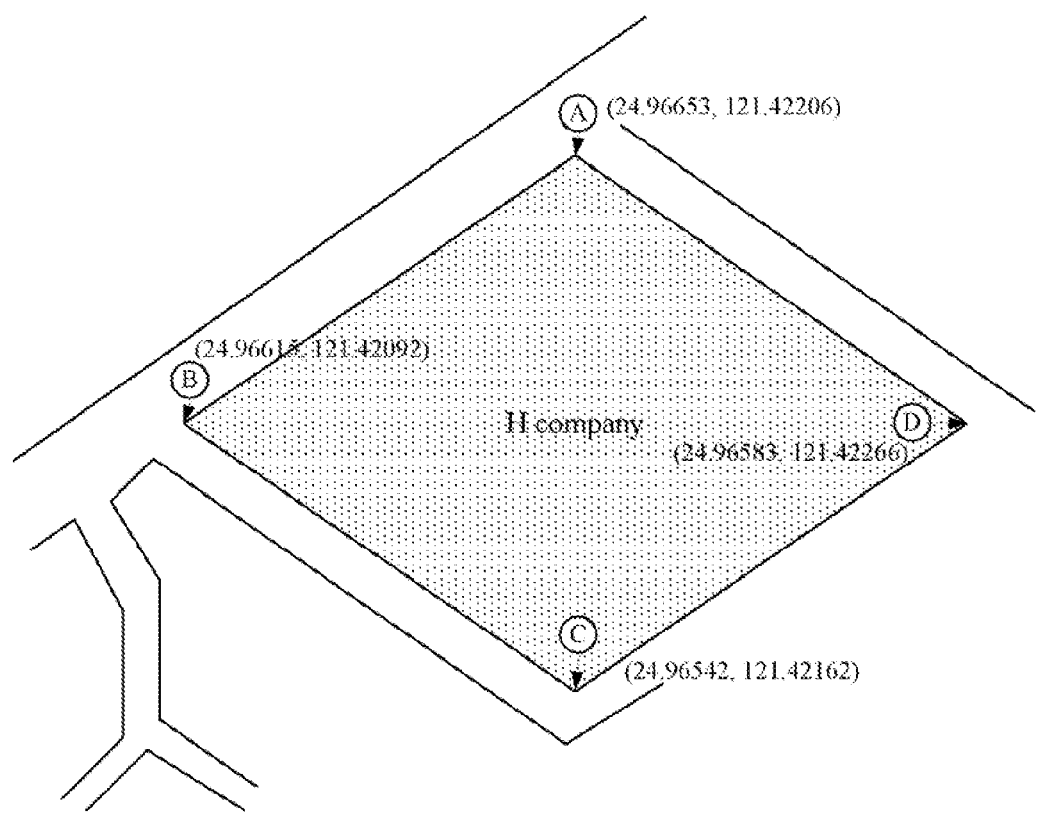
FIG. 4 displays a portion of an electronic map.

The electronic map 170 is operable to provide geographic information to the cloud server 10. The geographic information includes map data, such as roads, buildings, rivers, and building names (as shown in FIG. 4). In addition, the geographic information further includes geographical coordinates of the above-mentioned places and points on the map, such as latitude, longitude, and altitude. In one embodiment, the electronic map 170 is an electronic map information database on the Internet.

FIG. 3 is a flowchart of one embodiment of an access management method for protecting data security of the at least one cloud server 10. Depending on the embodiment, additional blocks may be added, others removed, and the ordering of the blocks may be changed.

In block S301, the storing module 120 stores IP addresses, account names, and passwords of the authorized clients 20 into the storage device 150. As mentioned above, the IP addresses are allocated by the cloud server 10. The account name and password of each authorized client 20 may be allocated by the cloud server 10, or be input by the authorized client 20 via an input device (e.g., a keyboard) and confirmed by the cloud server 10. Each authorized client 20 has a unique account name.

In block S303, the setting module 110 sets a location data range in relation to all authorized clients 20. In one embodiment, the location data range includes a number of latitudes and a number of longitudes, and may be set based on the geographical coordinates of one or more buildings of the enterprise or of the organization that possesses the data center 1. For example, as shown in FIG. 4, the buildings of an enterprise "A company" have four boundary locations A, B, C, and D as the relevant geographical locations, and then minimal and maximal latitudes and longitudes of the location data range may be determined according to latitudes and longitudes of the four boundary locations A, B, C, and D. For example, the acceptable range for the latitude of an authorized client 20 (as in FIG. 4) may be set as [24.96542, 24.96653], and the acceptable range for the longitude of the authorized clients 20 may be set as [121.42092, 121.42266]. The storing module 120 stores the location data range of all authorized clients 20 in the storage device 150.

In block S305, the receiving module 130 receives a request to access the cloud server 10 from a client.

In block S307, the validating module 140 requests the client to send location data of the client.

In block S309, the validating module 140 determines if location data of the client has been received within a preset time period (e.g., 30 seconds). If no location data of the client has been received within the preset time period, block S315 is implemented, and the validating module 140 will determine that the client is not an authorized client and accordingly refuse the client to access the cloud server 10. Otherwise, if any location data of the client has been received within the preset time period, block S311 is implemented.

In block S311, the validating module 140 determines if the location data sent by the client falls within the location data range. For example, the validating module 140 may determine if the latitude of the client falls within the range of latitudes [24.96542, 24.96653], and if the longitude of the client falls within the range of longitudes [121.42092, 121.42266]. If the location data of the client falls outside the location data range, block S315 as described above is implemented. Otherwise, if the location data of the client falls within the location data range, block S313 is implemented.

In block S313, the validating module 140 validates if the client passes additional authentication requirements, such as if an IP address, an account name and a password of the client respectively matches an IP address, an account name and a password of an authorized client 20. If the client fails any of the further authentication requirements, block S315 as described above is implemented. Otherwise, if the client passes all of the further authentication requirements, block S317 is implemented, and the validating module 140 determines the client is an authorized client 20 and allows access to the cloud server 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An access management method being performed by execution of instructions by a processor of a cloud server to protect data security of the cloud server, the method comprising:

setting a location data range in relation to authorized clients of the cloud server, and storing the location data range into a storage device;

requesting a client to send location data of the client in response to receiving a request to access the cloud server from the client;

determining if the location data of the client has been received within a preset time period, determining the client is not an authorized client and refusing the client to access the cloud server in response that no location data has been received from the client within the preset time period or the received location data falls outside the location data range, or determining if the client passes further authentication requirements in response that the received location data falls within the location data range; and determining the client is not an authorized client and refusing the client to access the cloud server in response that the client fails any of the further authentication requirements, or determining the client is an authorized client in response that the client passes all of the further authentication requirements.

2. The method of claim 1, wherein the location data range comprises a range of latitudes and a range of longitudes.

3. The method of claim 1, wherein the further authentication comprises determining if an IP address, an account name and a password of the client respectively matches an IP address, an account name and a password of an authorized client.

4. The method of claim 1, wherein each authorized client is installed with a global positioning system (GPS) receiver module for obtaining location data of the authorized client.

5. The method of claim 2, wherein the location data range is set based on an electronic map that displays geographical coordinates of one or more buildings of an enterprise or an organization that possesses the cloud server.

6. A non-transitory medium storing a set of instructions, the set of instructions capable of being executed by a processor of a cloud server to perform an access management method for protecting data security of the cloud server, the method comprising:

setting a location data range in relation to authorized clients of the cloud server, and storing the location data range into a storage device;

requesting a client to send location data of the client in response to receiving a request to access the cloud server from the client;

determining if the location data of the client has been received within a preset time period, determining the client is not an authorized client and refusing the client to access the cloud server in response that no location data has been received from the client within the preset time period or the received location data falls outside the location data range, or determining if the client passes further authentication requirements in response that the received location data falls within the location data range; and determining the client is not an authorized client and refusing the client to access the cloud server in response that the client fails any of the further authentication requirements, or determining the client is an authorized client in response that the client passes all of the further authentication requirements.

7. The medium of claim 6, wherein the location data range comprises a range of latitudes and a range of longitudes.

8. The medium of claim 6, wherein the further authentication comprises determining if an IP address, an account name and a password of the client respectively matches an IP address, an account name and a password of an authorized client.

9. The medium of claim 6, wherein each authorized client is installed with a global positioning system (GPS) receiver module for obtaining location data of the authorized client.

10. The medium of claim 7, wherein the location data range is set based on an electronic map that displays geographical coordinates of one or more buildings of an enterprise or an organization that possesses the cloud server.

11. A cloud server, comprising:
a storage device;
a processor; and
one or more programs stored in the storage device and being executable by the processor, the one or more programs comprising instructions:
to set a location data range in relation to authorized clients of the cloud server, and to store the location data range into a storage device;
to request a client to send location data of the client in response that a request to access the cloud server has been received from the client;
to determine if the location data of the client has been received within a preset time period, to determine the client is not an authorized client and refuse the client to access the cloud server in response that no location data has been received from the client within the preset time period or the received location data falls outside the location data range, or to determine if the client passes further authentication requirements in response that the received location data falls within the location data range; and
to determine the client is not an authorized client and refuse the client to access the cloud server in response that the client fails any of the further authentication requirements, or to determine the client is an authorized client in response that the client passes all of the further authentication requirements.

12. The cloud server of claim 11, wherein the location data range comprises a range of latitudes and a range of longitudes.

13. The cloud server of claim 11, wherein the further authentication comprises determining if an IP address, an account name and a password of the client respectively matches an IP address, an account name and a password of an authorized client.

14. The cloud server of claim 11, wherein each authorized client is installed with a global positioning system (GPS) receiver module for obtaining location data of the authorized client.

15. The cloud server of claim 12, wherein the location data range is set based on an electronic map that displays geographical coordinates of one or more buildings of an enterprise or an organization that possesses the cloud server.

* * * * *